US012094392B2

(12) United States Patent
Han et al.

(10) Patent No.: US 12,094,392 B2
(45) Date of Patent: *Sep. 17, 2024

(54) DISPLAY DEVICE AND DRIVING METHOD THEREOF

(71) Applicant: SAMSUNG DISPLAY CO., LTD., Yongin-si (KR)

(72) Inventors: Sang Su Han, Yongin-si (KR); Kyun Ho Kim, Yongin-si (KR); Seong Jun Kim, Yongin-si (KR); Jung Taek Kim, Yongin-si (KR); Hyung Keun Park, Yongin-si (KR); Joon Suk Baik, Yongin-si (KR); Se Keun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,961

(22) Filed: Sep. 11, 2023

(65) Prior Publication Data

US 2023/0419877 A1 Dec. 28, 2023

Related U.S. Application Data

(63) Continuation of application No. 18/148,772, filed on Dec. 30, 2022, now Pat. No. 11,756,474, which is a (Continued)

(30) Foreign Application Priority Data

Feb. 26, 2020 (KR) ........................ 10-2020-0023897

(51) Int. Cl.
*G09G 3/20* (2006.01)

(52) U.S. Cl.
CPC ..... *G09G 3/2092* (2013.01); *G09G 2310/027* (2013.01); *G09G 2310/0278* (2013.01)

(58) Field of Classification Search
CPC ........... G09G 3/2092; G09G 2310/027; G09G 2310/0278; G09G 3/3233;
(Continued)

(56) References Cited

U.S. PATENT DOCUMENTS 7,006,069 B2 2/2006 Tanaka et al.
7,505,026 B2 3/2009 Baba et al.
(Continued)

FOREIGN PATENT DOCUMENTS

JP 2006-189661 A 7/2006
JP 5076355 B2 11/2012
(Continued)

*Primary Examiner* — Amare Mengistu
*Assistant Examiner* — Gloryvid Figueroa-Gibson
(74) *Attorney, Agent, or Firm* — Lewis Roca Rothgerber Christie LLP

(57) ABSTRACT

A display device, includes: a scan driver configured to sequentially supply scan signals having a turn-on level to the first scan line and the second scan line during a first period and to concurrently supply scan signals having a turn-on level to the first scan line and the second scan line during a second period after the first period, wherein: a mask period corresponds to a difference between a start point of the second period and a start point of the first period in a next frame period, a first frame period and a second frame period have different mask periods, a third frame period between the first frame period and the second frame period has a same mask period as the first frame period, and a fourth frame period between the first frame period and the second frame period has a same mask period as the second frame period.

19 Claims, 13 Drawing Sheets

Related U.S. Application Data continuation of application No. 17/036,916, filed on Sep. 29, 2020, now Pat. No. 11,545,068.

(58) Field of Classification Search

CPC ..... G09G 2310/0205; G09G 2310/061; G09G 2310/062; G09G 2320/0261; G09G 2320/0653; G09G 2320/10; G09G 3/3266; G09G 3/32; G09G 3/22; G09G 3/2018; G09G 2310/0243; G09G 2310/06; G09G 2310/08

USPC .......................................................... 345/204

See application file for complete search history.

(56) References Cited

U.S. PATENT DOCUMENTS

| | | | | |
|---|---|---|---|---|
| 2004/0027323 | A1* | 2/2004 | Tanaka ................. | G09G 3/3611 345/98 |
| 2009/0237347 | A1 | 9/2009 | Yamagishi | |
| 2016/0063962 | A1 | 3/2016 | Park et al. | |
| 2017/0047028 | A1 | 2/2017 | Seo et al. | |
| 2020/0020280 | A1 | 1/2020 | Han et al. | |

FOREIGN PATENT DOCUMENTS

| | | | |
|---|---|---|---|
| KR | 10-2004-0002792 | A | 1/2004 |
| KR | 10-1560403 | B1 | 10/2015 |
| KR | 10-2018-0060530 | A | 6/2018 |

* cited by examiner

DISPLAY DEVICE AND DRIVING METHOD THEREOF

CROSS-REFERENCE TO RELATED APPLICATIONS

This application is a continuation of U.S. patent application Ser. No. 18/148,772, filed Dec. 30, 2022, which is a continuation of U.S. patent application Ser. No. 17/036,916, filed Sep. 29, 2020, now U.S. Pat. No. 11,545,068, which claims priority to and the benefit of Korean Patent Application No. 10-2020-0023897, filed Feb. 26, 2020, the entire content of all of which is incorporated herein by reference.

BACKGROUND

1. Field

Aspects of some example embodiments of the present disclosure relate to a display device and a driving method thereof.

2. Related Art

With the development of information technology, display devices, which provide a connecting medium between information and users, have become more important. Accordingly, the use of display devices, such as liquid crystal display devices, organic light-emitting display devices, plasma display devices, and the like, is increasing.

A display device may display a moving or video image by consecutively displaying a plurality of frames. Here, each of the frames may include an image display period, during which an image is displayed, and a mask period, during which no image is displayed.

It may be necessary to increase or decrease the mask period depending on the circumstances. A change in the mask period (that is, the increment or decrement) cannot be freely determined due to hardware/time constraints. Accordingly, there may be a problem in which a change in luminance is perceived by users depending on the change in the mask period.

The above information disclosed in this Background section is only for enhancement of understanding of the background and therefore the information discussed in this Background section does not necessarily constitute prior art.

SUMMARY

Aspects of some example embodiments of the present disclosure are directed to a display device and a driving method thereof configured to subdivide the variation of a mask period, thereby preventing or reducing instances of a change in luminance that is perceptible to users even when the mask period is changed.

Aspects of some example embodiments of the present disclosure include a display device including a first pixel coupled to a first scan line and a data line, a second pixel coupled to a second scan line and the data line, and a scan driver configured to sequentially supply scan signals having a turn-on level to the first scan line and the second scan line during a first period and to simultaneously or concurrently supply scan signals having a turn-on level to the first scan line and the second scan line during a second period after the first period. A mask period may correspond to the difference between the start point of the second period and the start point of the first period in the next frame period, a first frame period and a second frame period may have different mask periods, a third frame period between the first frame period and the second frame period may have the same mask period as the first frame period, and a fourth frame period between the first frame period and the second frame period may have the same mask period as the second frame period.

According to some example embodiments, each frame period may include an image display period and the mask period, and the image display period may correspond to the difference between the start point of the first period and the start point of the second period in one frame period.

According to some example embodiments, the display device may further include a data driver configured to apply a data voltage corresponding to a mask grayscale to the data line during the second period.

According to some example embodiments, the display device may further include a scan start signal generator configured to supply a first scan start pulse, corresponding to the start point of the first period, and a second scan start pulse, corresponding to the start point of the second period, to the scan driver.

According to some example embodiments, the interval between the time at which the first scan start pulse is generated and the time at which the second scan start pulse is generated in the first frame period may be different from that in the second frame period, the interval between the time at which the first scan start pulse is generated and the time at which the second scan start pulse is generated in the third frame period may be the same as that in the first frame period, and the interval between the time at which the first scan start pulse is generated and the time at which the second scan start pulse is generated in the fourth frame period may be the same as that in the second frame period.

According to some example embodiments, the display device may further include a third pixel coupled to a third scan line and the data line and a fourth pixel coupled to a fourth scan line and the data line. The scan driver may supply a scan signal having a turn-on level to the third scan line during a third period and supply a scan signal having a turn-on level to the fourth scan line during a fourth period, and the first period, the third period, the second period, and the fourth period may be sequentially located in a frame period.

According to some example embodiments, the first period may be longer than each of the second period, the third period, and the fourth period.

According to some example embodiments, the second period, the third period, and the fourth period may have the same length.

According to some example embodiments, the number of scan signals having a turn-on level and output from the scan driver during the second period in the first frame period may be the same as the number of scan signals having a turn-on level and output from the scan driver during the second period in the second frame period.

Aspects of some example embodiments of the present disclosure may include a method of driving a display device including a scan driver, a first pixel coupled to a first scan line and a data line, and a second pixel coupled to a second scan line and the data line. The method may include sequentially supplying, by the scan driver, scan signals having a turn-on level to the first scan line and the second scan line during a first period of each frame period, and simultaneously or concurrently supplying, by the scan driver, scan signals having a turn-on level to the first scan line and the second scan line during a second period in each frame period. A mask period may correspond to the difference between the start point of the second period and the start point of the first period in the next frame period, a first frame period and a second frame period may have different mask periods, a third frame period between the first frame period and the second frame period may have the same mask period as the first frame period, and a fourth frame period between the first frame period and the second frame period may have the same mask period as the second frame period.

According to some example embodiments, the method may further include applying a data voltage corresponding to a mask grayscale to the data line during the second period.

According to some example embodiments, the method may further include supplying a first scan start pulse, corresponding to the start point of the first period, and a second scan start pulse, corresponding to the start point of the second period, to the scan driver.

According to some example embodiments, the interval between the time at which the first scan start pulse is generated and the time at which the second scan start pulse is generated in the first frame period may be different from that in the second frame period, the interval between the time at which the first scan start pulse is generated and the time at which the second scan start pulse is generated in the third frame period may be the same as that in the first frame period, and the interval between the time at which the first scan start pulse is generated and the time at which the second scan start pulse is generated in the fourth frame period may be the same as that in the second frame period.

According to some example embodiments, the display device may further include a third pixel coupled to a third scan line and the data line and a fourth pixel coupled to a fourth scan line and the data line. The scan driver may supply a scan signal having a turn-on level to the third scan line during a third period and supply a scan signal having a turn-on level to the fourth scan line during a fourth period, and the first period, the third period, the second period, and the fourth period may be sequentially located in a frame period.

According to some example embodiments, the first period may be longer than each of the second period, the third period, and the fourth period.

According to some example embodiments, the second period, the third period, and the fourth period may have the same length.

According to some example embodiments, the number of scan signals having a turn-on level and output from the scan driver during the second period in the first frame period may be the same as the number of scan signals having a turn-on level and output from the scan driver during the second period in the second frame period.

Aspects of some example embodiments of the present disclosure may include a display device including a first pixel coupled to a first scan line and a data line, a second pixel coupled to a second scan line and the data line, a scan driver configured to sequentially supply scan signals having a turn-on level to the first scan line and the second scan line in response to a first scan start pulse and to simultaneously or concurrently supply scan signals having a turn-on level to the first scan line and the second scan line in response to a second scan start pulse after the first scan start pulse, a mask duty controller configured to determine second mask periods for at least two consecutive frame periods based on a single first mask period, and a scan start signal generator configured to supply the first scan start pulse and the second scan start pulse in each frame period and to determine the interval between the time at which the first scan start pulse is generated and the time at which the second scan start pulse is generated based on the second mask period corresponding to each frame period.

According to some example embodiments, a first frame period and a second frame period may have different mask periods, a third frame period between the first frame period and the second frame period may have the same mask period as the first frame period, a fourth frame period between the first frame period and the second frame period may have the same mask period as the second frame period, the interval between the time at which the first scan start pulse is generated and the time at which the second scan start pulse is generated in the first frame period may be different from that in the second frame period, the interval between the time at which the first scan start pulse is generated and the time at which the second scan start pulse is generated in the third frame period may be the same as that in the first frame period, and the interval between the time at which the first scan start pulse is generated and the time at which the second scan start pulse is generated in the fourth frame period may be the same as that in the second frame period.

Aspects of some example embodiments of the present disclosure may include a display device including a plurality of pixels coupled to the same scan line. The plurality of pixels may display a monochromatic image during a first mask period of q horizontal periods and display a moving or video image during a first image display period of r horizontal periods, in each of consecutive first frame periods, each of the first frame periods may be configured with q+r horizontal periods, each of q and r being an integer greater than 0, the plurality of pixels may display a monochromatic image during a second mask period of q+1u horizontal periods and display a moving or video image during a second image display period of s horizontal periods, in each of consecutive second frame periods, each of the second frame periods may be configured with q+1u+s horizontal periods, each of u and s being an integer greater than 0, q+r horizontal periods may be the same as q+1u+s horizontal periods, the plurality of pixels may display a monochromatic image during a third mask period of q horizontal periods and display a moving or video image during a third image display period of r horizontal periods, in at least one third frame period, the plurality of pixels may display a monochromatic image during a fourth mask period of q+1u horizontal periods and display a moving or video image during a fourth image period of s horizontal periods, in at least one fourth frame period, the at least one third frame period and the at least one fourth frame period may be located between the end point of the consecutive first frame periods and the start point of the consecutive second frame periods, and the at least one third frame period and the at least one fourth frame period may be alternated with each other at regular intervals.

DETAILED DESCRIPTION

Figure 1:
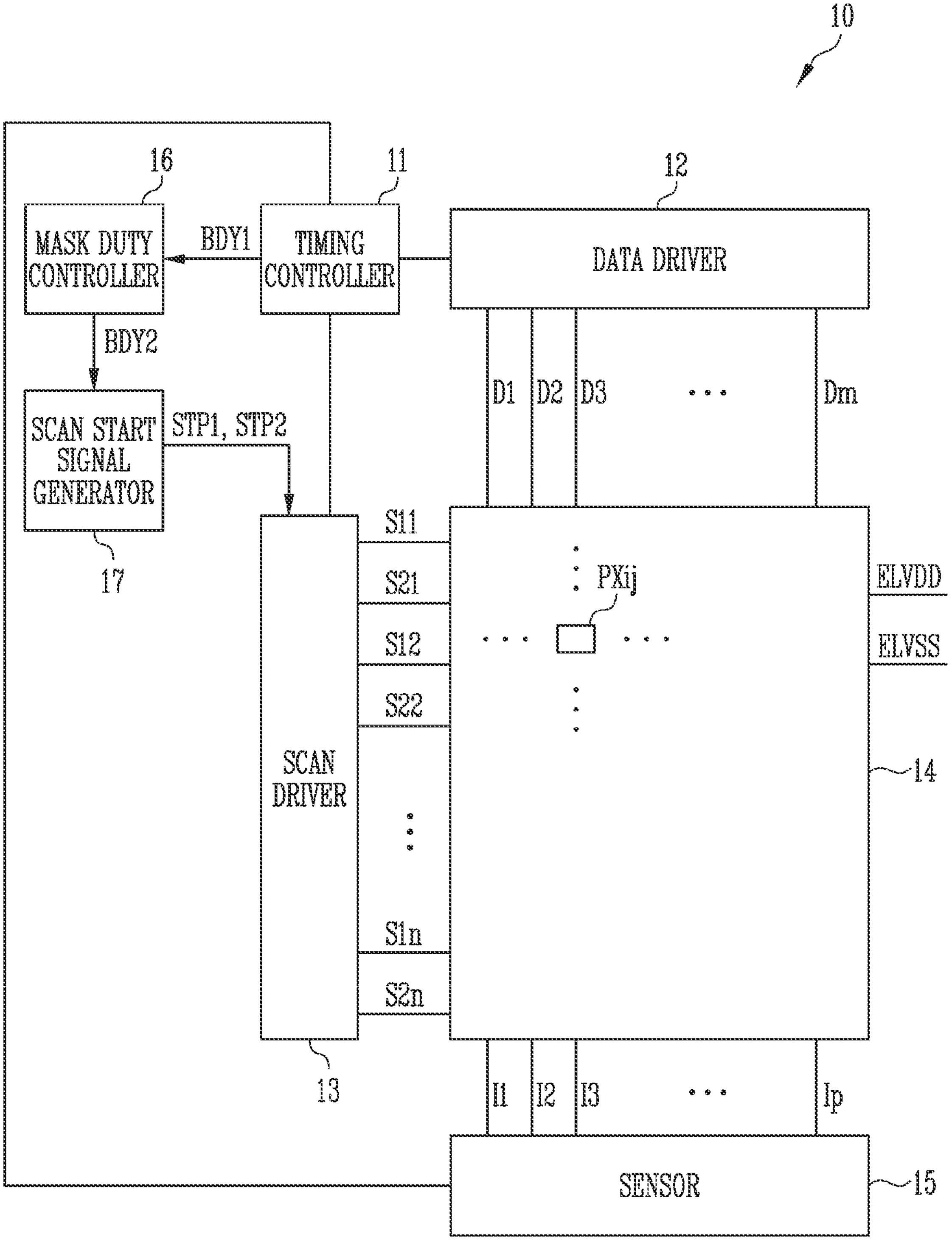
FIG. 1 is a diagram illustrating a display device according to some example embodiments of the present disclosure.

Hereinafter, aspects of some example embodiments of the present disclosure will be described in more detail with reference to the attached drawings, such that those skilled in the art can implement embodiments according to the present disclosure. Aspects of embodiments according to the present disclosure may be embodied in various different forms without being limited to the following example embodiments. Aspects of embodiments according to the present disclosure may be used by being combined with each other, or may be used individually.

Furthermore, in the drawings, portions which are not related to the present disclosure will be omitted to explain the present disclosure more clearly. Reference should be made to the drawings, in which similar reference numerals are used throughout the different drawings to designate similar components. Therefore, reference numerals described in a previous drawing may be used in other drawings.

Since the sizes and thicknesses of respective components are arbitrarily indicated in drawings for convenience of description, the present disclosure is not limited by the drawings. The sizes, thicknesses, etc. of components in the drawings may be exaggerated to make the description of a plurality of layers and areas clear.

FIG. 1 is a diagram illustrating a display device according to some example embodiments of the present disclosure.

The display device 10 according to some example embodiments of the present disclosure may include a timing controller 11, a data driver 12, a scan driver 13, a pixel component 14, a sensor 15, a mask duty controller 16, and a scan start signal generator 17.

The timing controller 11 may receive grayscale values and control signals for each image frame from an external processor. The control signals may include a vertical synchronization signal, a horizontal synchronization signal, a data enable signal, and the like. The vertical synchronization signal may include a plurality of pulses, and the time at which each of the pulses is generated may indicate that the previous frame period ends and the current frame period starts. The interval between adjacent pulses of the vertical synchronization signal may correspond to one frame period. The horizontal synchronization signal may include a plurality of pulses, and the time at which each of the pulses is generated may indicate that the previous horizontal period ends and a new horizontal period starts. The interval between adjacent pulses of the horizontal synchronization signal Hsync may correspond to one horizontal period. According to some example embodiments, one horizontal period may correspond to the minimum interval between the start points of scan signals having a turn-on level. The data enable signal may have an enable level for specific horizontal periods, and may have a disable level in the period excluding the specific horizontal periods. When the data enable signal has an enable level, this may indicate that grayscale values are supplied in the corresponding horizontal periods. The grayscale values may be supplied in units of pixel rows in each of the corresponding horizontal periods.

The timing controller 11 may perform rendering on grayscale values so as to correspond to the specifications of the display device 10. For example, the external processor may supply a red grayscale value, a green grayscale value, and a blue grayscale value for each unit dot. However, when, for example, the pixel component 14 is in a pentile structure, because neighboring unit dots share a pixel, each grayscale value may not correspond to the pixel in a one-to-one manner. In this case, it is necessary to perform rendering on the grayscale values. When each grayscale value corresponds to the pixel in a one-to-one manner, it may be unnecessary to perform rendering on the grayscale values. The grayscale values on which rendering is or is not performed may be supplied to the data driver 12. Also, the timing controller 11 may supply the data driver 12, the scan driver 13, the sensor 15, and the like with control signals suitable for the specifications thereof in order to display a frame. Also, the timing controller 11 may supply first mask duty information BDY1.

The data driver 12 may generate data voltages to be supplied to data lines D1, D2, D3, and Dm using the grayscale values and control signals. For example, the data driver 12 may sample the grayscale values using a clock signal and apply data voltages, corresponding to the grayscale values, to the data lines D1 to Dm in units of pixel rows. Here, m may be an integer greater than 0.

The scan driver 13 may receive clock signals and output enable signals from the timing controller 11, and may generate scan signals to be supplied to scan lines S11, S21, S12, S22, S1n and S2*n* by receiving a scan start signal from the scan start signal generator 17. Here, n may be an integer greater than 0. In a first mode, the scan start signal may include at least two scan start pulses STP1 and STP2 in one frame period. In a second mode, the scan start signal may include only one scan start pulse STP1 in one frame period. The example configuration and operation of the scan driver 13 will be described in more detail later with reference to FIG. 4.

The sensor 15 may supply an initialization voltage to sensing lines I1, I2, I3 and Ip by receiving a control signal from the timing controller 11, or may receive a sensing signal. For example, the sensor 15 may supply the initialization voltage to the sensing lines I1, I2, I3 and Ip during at least a portion of a display period. For example, the sensor 15 may receive sensing signals through the sensing lines I1, I2, I3 and Ip during at least a portion of a sensing period. The sensor 15, the timing controller 11, the data driver 12, or any other controller may calculate the characteristics of each pixel PXij using the received sensing signals. The characteristics of each pixel PXij may be the threshold voltage of a driving transistor, the mobility, or the degree by which a light-emitting diode is degraded. Here, p may be an integer greater than 0.

The pixel component 14 includes a plurality of pixels. Each of the pixels PXij may be coupled to a data line, a scan line, and a sensing line corresponding thereto. The example configuration and operation of the pixel PXij will be described in more detail later with reference to FIG. 2 and FIG. 3.

The mask duty controller 16 may receive the first mask duty information BDY1 and supply second mask duty information BDY2 based on the first mask duty information BDY1. The first mask duty information BDY1 may include information about a first mask period, and the second mask duty information BDY2 may include information about a second mask period. The mask duty controller 16 may determine second mask periods for at least two consecutive frame periods based on a single first mask period.

The scan start signal generator 17 may receive the second mask duty information BDY2 and supply a scan start signal including a first scan start pulse STP1 and a second scan start pulse STP2 based on the second mask duty information BDY2. The second scan start pulse STP2 may be generated in the same frame period as the first scan start pulse STP1 corresponding thereto.

The scan start signal generator 17 may supply the first scan start pulse STP1 and the second scan start pulse STP2 in each frame period, and may determine the interval between the time at which the first scan start pulse STP1 is generated and the time at which the second scan start pulse STP2 is generated based on the second mask period corresponding to each frame period.

The mask duty controller 16 and the scan start signal generator 17 will be described in more detail with reference to FIG. 9 and FIG. 10.

Figure 2:
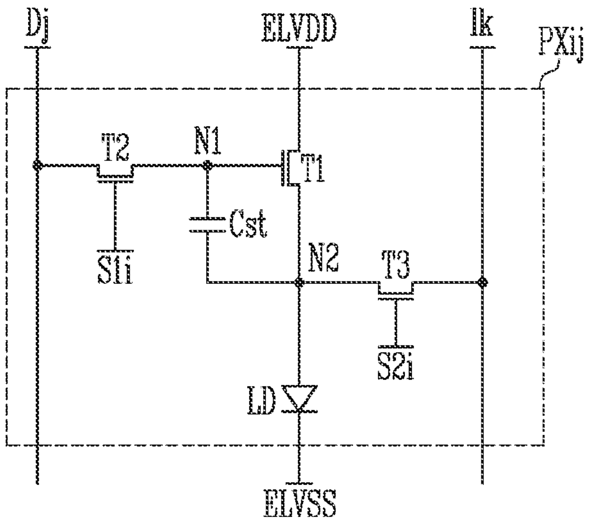
FIG. 2 is a diagram illustrating a pixel according to some example embodiments of the present disclosure.

FIG. 2 is a diagram illustrating a pixel according to some example embodiments of the present disclosure.

Referring to FIG. 2, the pixel PXij according to some example embodiments of the present disclosure may include transistors T1, T2 and T3, a storage capacitor Cst, and a light-emitting diode LD.

The transistors T1, T2 and T3 may be configured as N-type transistors. According to some example embodiments, the transistors T1, T2 and T3 may be configured as P-type transistors. According to some example embodiments, the transistors T1, T2 and T3 may be configured as a combination of N-type transistors and P-type transistors. The P-type transistor commonly indicates a transistor configured such that the amount of applied current increases when the difference between the voltage of a gate electrode and that of a source electrode increases in a negative direction. The N-type transistor commonly indicates a transistor configured such that the amount of applied current increases when the difference between the voltage of a gate electrode and that of a source electrode increases in a positive direction. The transistor may be configured in any of various forms such as a thin-film transistor (TFT), a field effect transistor (FET), a bipolar junction transistor (BJT), and the like.

The first transistor T1 may be configured such that the gate electrode thereof is coupled to a first node N1, the first electrode thereof is coupled to a first power source ELVDD, and the second electrode thereof is coupled to a second node N2. The first transistor T1 may be referred to as a driving transistor.

The second transistor T2 may be configured such that the gate electrode thereof is coupled to a data scan line S1*i*, the first electrode thereof is coupled to a data line Dj, and the second electrode thereof is coupled to the first node N1. The second transistor T2 may be referred to as a scanning transistor.

The third transistor T3 may be configured such that the gate electrode thereof is coupled to a sensing scan line S2*i*, the first electrode thereof is coupled to the second node N2, and the second electrode thereof is coupled to a sensing line Ik. The third transistor T3 may be referred to as a sensing transistor.

The storage capacitor Cst may be configured such that the first electrode thereof is coupled to the first node N1 and the second electrode thereof is coupled to the second node N2.

The light-emitting diode LD may be configured such that the anode thereof is coupled to the second node N2 and the cathode thereof is coupled to a second power source ELVSS. The light-emitting diode LD may be configured in any of various forms such as an organic light-emitting diode, an inorganic light-emitting diode, a quantum dot diode, a quantum well diode, and the like. Also, the light-emitting diode LD is illustrated as a single light-emitting diode in FIG. 2, but embodiments according to the present disclosure are not limited thereto, and according to some example embodiments, the light-emitting diode LD may be configured as a plurality of light-emitting diodes coupled in parallel, in series, or in series and parallel.

Generally, the voltage of the first power source ELVDD may be higher than the voltage of the second power source ELVSS. However, the voltage of the second power source ELVSS may be set higher than the voltage of the first power source ELVDD in a special situation in which the light-emitting diode LD is prevented from emitting light (for example, during a portion of a sensing period).

Figure 3:
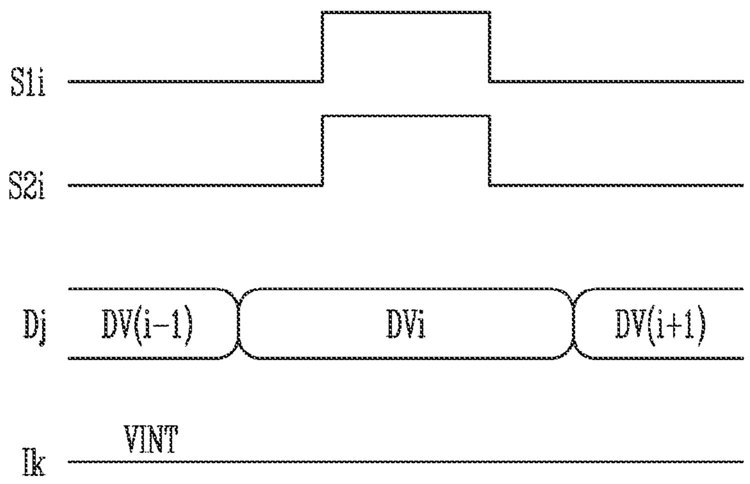
FIG. 3 is a diagram illustrating a method of driving the pixel of FIG. 2.

FIG. 3 is a diagram illustrating a method of driving the pixel of FIG. 2.

During a display period, the sensing line Ik may be coupled to an initialization power source VINT.

During the display period, data voltages DV(i−1), DVi and DV(i+1) may be sequentially applied to the data line Dj in units of horizontal periods. A scan signal having a turn-on level (a high level) may be applied to the data scan line S1*i* in the corresponding horizontal period. Also, a scan signal having a turn-on level may also be applied to the sensing scan line S2*i* by being synchronized with the data scan line S1*i*. According to some example embodiments, during the display period, the sensing scan line S2*i* may be in the state in which a scan signal having a turn-on level is always applied thereto.

For example, when a scan signal having a turn-on level is applied to the data scan line S1*i* and the sensing scan line S2*i*, the second transistor T2 and the third transistor T3 may be turned on. Accordingly, a voltage corresponding to the difference between the data voltage DVi and the initialization power VINT may be written to the storage capacitor Cst of the pixel PXij.

In the pixel PXij, the amount of driving current flowing in a driving path that couples the first power source ELVDD, the first transistor T1, and the second power source ELVSS is determined depending on the difference between the voltage of the gate electrode of the first transistor T1 and the voltage of the source electrode of the first transistor T1. Depending on the amount of the driving current, the light emission luminance of the light-emitting diode LD may be determined.

Then, when a scan signal having a turn-off level (a low level) is applied to the data scan line S1*i* and the sensing scan line S2*i*, the second transistor T2 and the third transistor T3 may be turned off. Accordingly, regardless of a change in the voltage of the data line Dj, the difference between the voltage of the gate electrode of the first transistor T1 and the voltage of the source electrode of the first transistor T1 is maintained by the storage capacitor Cst, and the light emission luminance of the light-emitting diode LD may be maintained.

Figure 4:
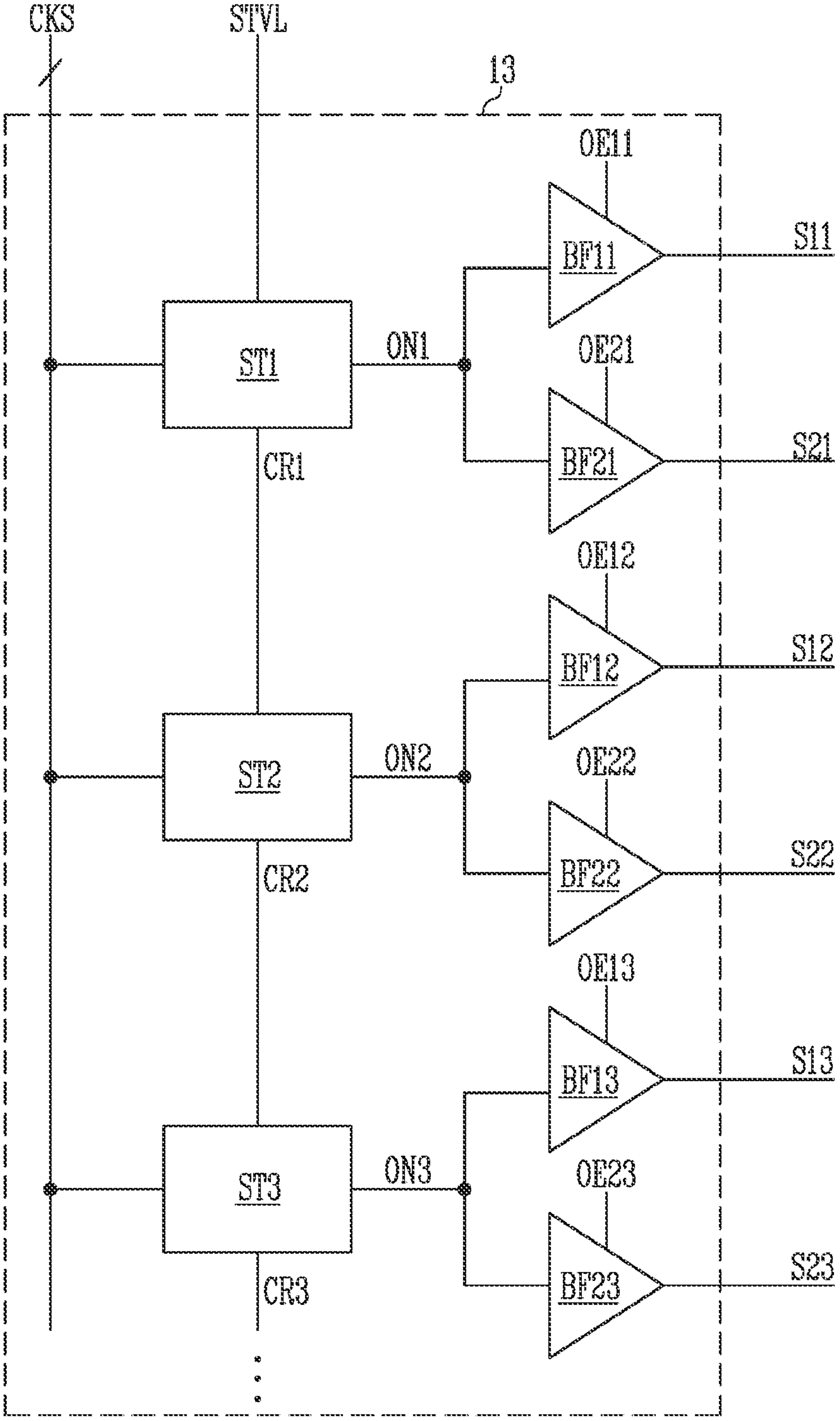
FIG. 4 is a diagram illustrating a scan driver according to some example embodiments of the present disclosure.

FIG. 4 is a diagram illustrating a scan driver according to some example embodiments of the present disclosure.

Referring to FIG. 4, the scan driver 13 according to some example embodiments of the present disclosure may include a plurality of scan stages ST1, ST2 and ST3.

Each of the scan stages ST1, ST2 and ST3 may be coupled to at least some of clock lines CKS. The first scan stage ST1 may be coupled to a scan start line STVL and a first carry line CR1. Each of the other scan stages ST2 and ST3 may be coupled to the carry line coupled to the previous scan stage and the carry line coupled to the next scan stage. For example, the second scan stage ST2 may be coupled to the first carry line CR1 and a second carry line CR2. The third scan stage ST3 may be coupled to the second carry line CR2 and a third carry line CR3.

The scan stages ST1, ST2 and ST3 may sequentially transmit a carry signal by being coupled in the form of a shift register. When the first scan stage ST1 receives a first scan start pulse STP1, a first output node ON1 is charged under the control of clock signals, and a first carry signal may be output to the first carry line CR1. When the second scan stage ST2 receives the first carry signal, a second output node ON2 is charged under the control of clock signals, and a second carry signal may be output to the second carry line CR2. When the third scan stage ST3 receives the second carry signal, a third output node ON3 is charged under the control of clock signals, and a third carry signal may be output to the third carry line CR3.

Each of the scan stages may be coupled to at least two buffers. For example, each of the buffers may be configured in the form of a complementary metal-oxide-semiconductor (CMOS), or may be configured as two transistors that are coupled in series. When it receives an output enable signal in the state in which the output node is charged, each of the buffers may output a scan signal having a turn-on level to a scan line corresponding thereto. The voltage level of the output node in the charged state and the voltage level of the output enable signal may be variously configured depending on the configuration of the buffer.

For example, a buffer BF11 may output a scan signal having a turn-on level to a first data scan line S11 when it receives an output enable signal OE11 in the state in which the first output node ON1 is charged. For example, the buffer BF11 may output a scan signal having a turn-off level to the first data scan line S11 if it does not receive the output enable signal OE11 even though the first output node ON1 is in the charged state. Similarly, a buffer BF21 may output a scan signal having a turn-on level to a first sensing scan line S21 when it receives an output enable signal OE21 in the state in which the first output node ON1 is charged. For example, the buffer BF21 may output a scan signal having a turn-off level to the first sensing scan line S21 if it does not receive the output enable signal OE21 even though the first output node ON1 is in the charged state.

The above description may be applied to the buffers BF12, BF22, BF13 and BF23 and the output enable signals OE12, OE22, OE13 and OE23 in the same manner, and thus a repeated description will be omitted.

Hereinafter, a data scan line is described as the scan line of a corresponding scan stage for the convenience of description. Because the timing of the scan signal having a turn-on level and applied to a sensing scan line may be synchronized with the timing of the scan signal having a turn-on level and applied to a data scan line during a display period (as shown in FIG. 3), a description will not be made unless it is a special case.

Figure 5:
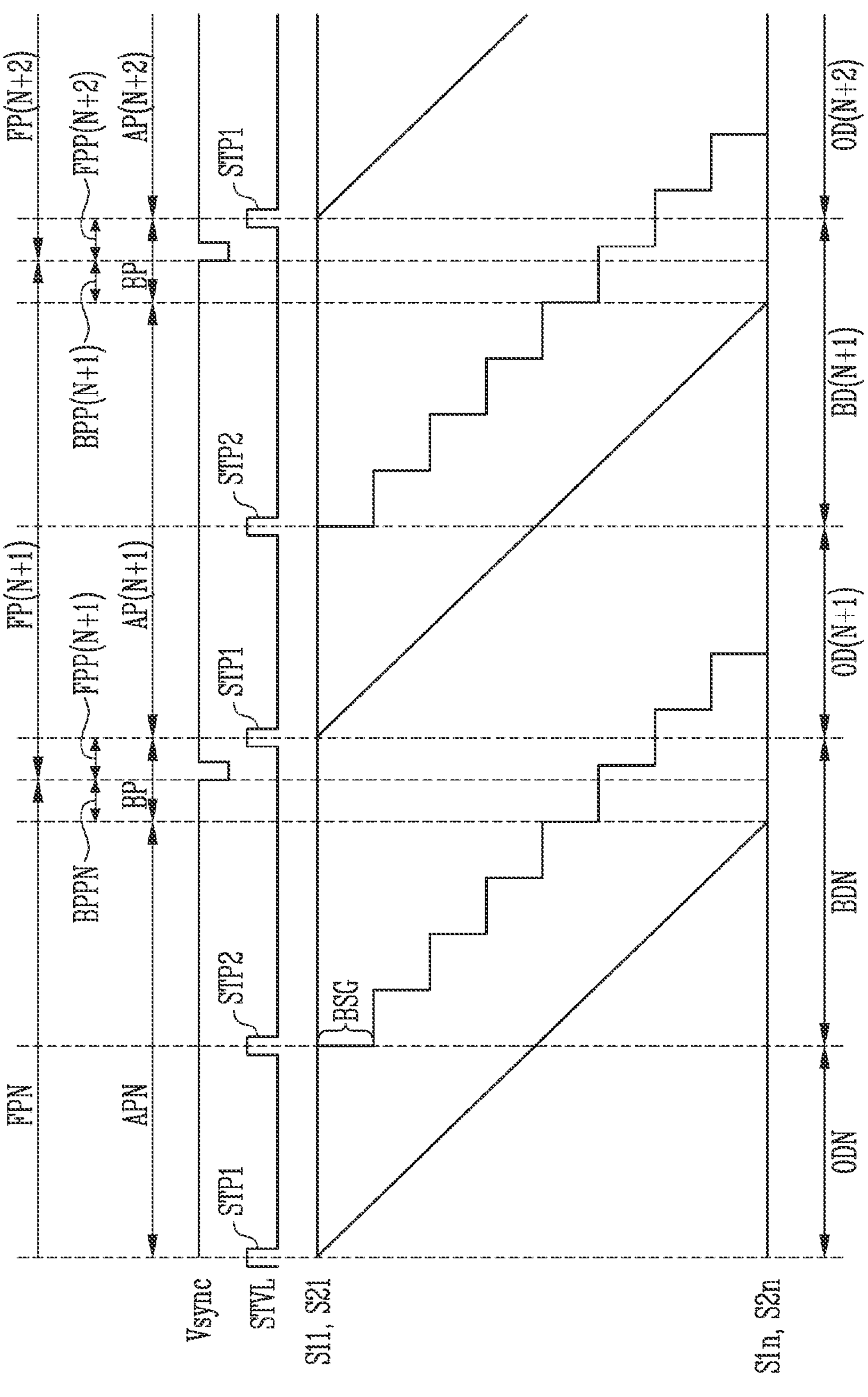
FIG. 5 and FIG. 6 are diagrams illustrating an image display period and a mask period according to some example embodiments of the present disclosure.
Figure 6:
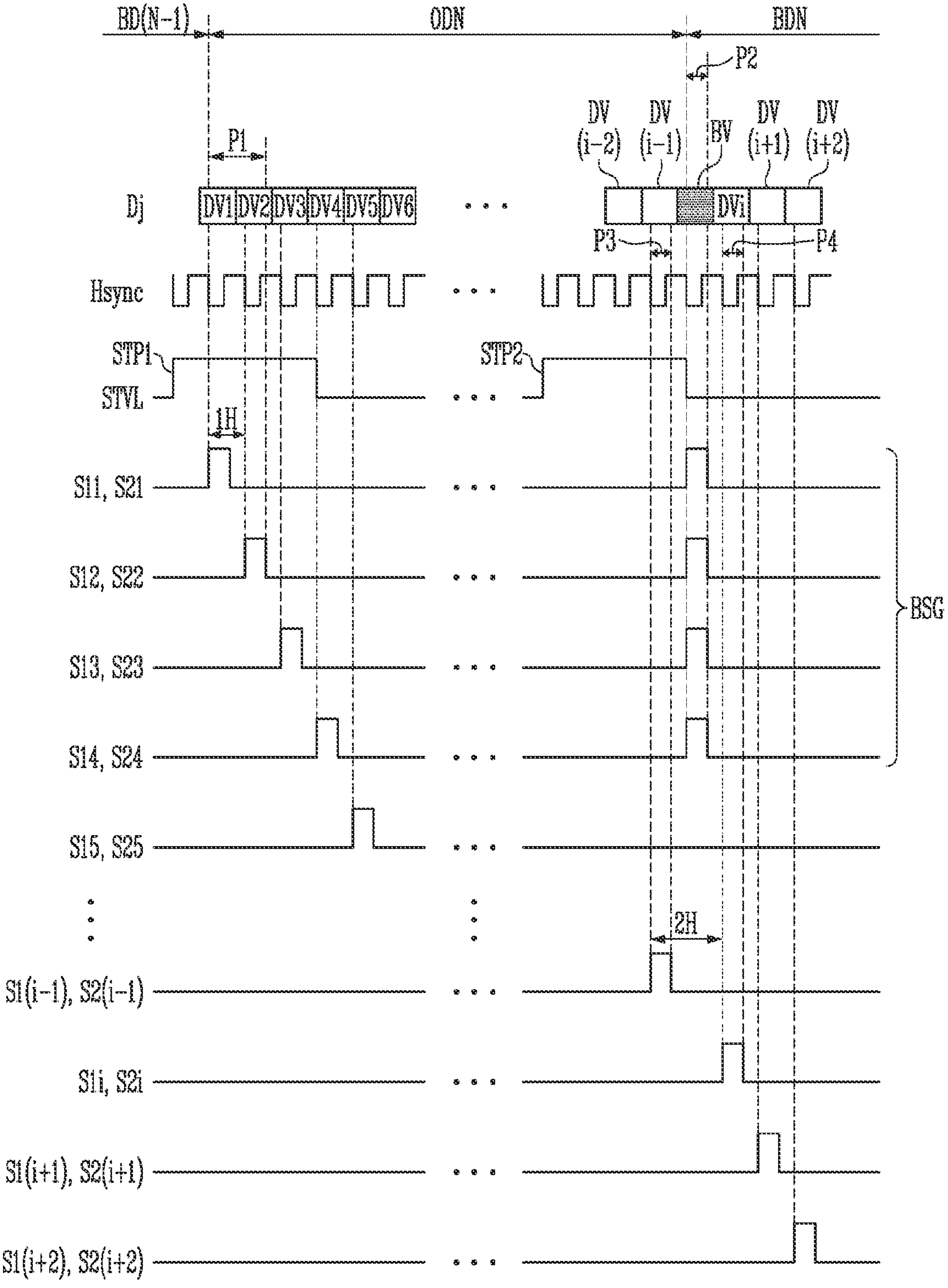

FIG. 5 and FIG. 6 are diagrams illustrating an image display period and a mask period according to some example embodiments of the present disclosure. Hereinafter, a frame period, an image display period, and a mask period will be described based on a first scan line S11.

Referring to FIG. 5, three consecutive frame periods FPN, FP(N+1) and FP(N+2) are illustrated. Each of the frame periods may include a front porch period, an active period, and a back porch period. The front porch period may be the period between the time at which the frame period starts and the time at which the active period starts. The active period may be the period in which grayscale values corresponding to the frame are supplied. The back porch period may be the period between the time at which the active period ends and the time at which the frame period ends. A blank period BP may be a period including the consecutive front porch period and back porch period. In the blank period BP, grayscale values for pixels are not supplied.

For example, the N-th frame period FPN may include a front porch period, an active period APN, and a back porch period BPPN. The (N+1)-th frame period FP(N+1) may include a front porch period FPP(N+1), an active period AP(N+1), and a back porch period BPP(N+1). The (N+2)-th frame period FP(N+2) may include a front porch period FPP(N+2), an active period AP(N+2), and a back porch period.

The front porch period may start from the time at which the pulse of a vertical synchronization signal Vsync is generated. The length of the front porch period may correspond to an integer multiple of 1 horizontal period 1H. Each of the active period and the back porch period may also correspond to an integer multiple of 1 horizontal period 1H. The 1 horizontal period 1H may correspond to the minimum interval between the start points of sequentially supplied scan signals having a turn-on level.

In each of the frame periods FPN, FP(N+1) and FP(N+2), a first scan start pulse STP1 and a second scan start pulse STP2 may be sequentially applied to a scan start line STVL (in the case of a first mode).

Hereinafter, an image display period ODN and a mask period BDN based on the N-th frame period FPN will be described in more detail with reference to FIG. 5 and FIG. 6.

When an active period is started, the first scan start pulse STP1 may be applied to the scan start line STVL. Here, the scan driver 13 may sequentially supply scan signals having a turn-on level to the scan lines S11, S12, S13, S14 and S15 of a scan stage unit. For example, the scan driver 13 may sequentially supply scan signals having a turn-on level to the first scan line S11 and the second scan line S12 during a first period P1. For example, the scan driver 13 may supply a scan signal having a turn-on level to the (i−1)-th scan line S1(*i*−1) during a third period P3. Here, the data driver 12 may sequentially apply data voltages DV1, DV2, DV3, DV4, DV5, DV6, DV(i−2) and DV(i−1) corresponding to the grayscale values of the frame to the data lines Dj.

When the second scan start pulse STP2 is applied to the scan start line STVL, the scan driver 13 may simultaneously or concurrently supply scan signals having a turn-on level to a mask scan group BSG including two or more scan lines S11, S12, S13 and S14. For example, the scan driver 13 may simultaneously or concurrently supply scan signals having a turn-on level to the first scan line S11 and the second scan line S12 during a second period P2 after the first period P1. Here, the data driver 12 may supply data voltages BV corresponding to a mask grayscale to the data lines Dj. For example, the data driver 12 may apply the data voltage BV corresponding to the mask grayscale to the data line Dj. For example, the mask grayscale may be a black grayscale (a grayscale of 0). For example, the mask grayscale may be a low grayscale (e.g., a set or predetermined low grayscale).

The scan signals having a turn-on level and output in response to the second scan start pulse STP2 may not overlap in time with the scan signals having a turn-on level and output in response to the first scan start pulse STP1. That is, when scan signals having a turn-on level are simultaneously or concurrently supplied to the mask scan group BSG in response to the second scan start pulse STP2, a scan signal having a turn-on level may not be supplied to the i-th scan line S1*i*. That is, scan signals having a turn-on level are supplied to the scan lines S11 to S1(*i*−1) at an interval of 1 horizontal period 1H in response to the first scan start pulse STP1, and a scan signal having a turn-on level may be supplied to the i-th scan line S1*i* at least 2 horizontal periods 2H after the scan signal having a turn-on level is supplied to the (i−1)-th scan line S1(*i*−1). Then, before scan signals having a turn-on level are simultaneously or concurrently supplied to the next mask scan group (e.g., the fifth to eighth scan lines), scan signals having a turn-on level may be sequentially supplied to the scan lines S1(*i*+1) and S1(*i*+2) at an interval of 1 horizontal period 1H. For example, the scan driver 13 may supply a scan signal having a turn-on level to the i-th scan line S1*i* during a fourth period P4.

In a frame period FPN, the first period P1, the third period P3, the second period P2, and the fourth period P4 may be sequentially located. The first period P1 may be longer than each of the second period P2, the third period P3, and the fourth period P4. The second period P2, the third period P3, and the fourth period P4 may have the same length.

The interval between the time at which the first scan start pulse STP1 is generated and the time at which the second scan start pulse STP2 is generated may be defined as the image display period of the corresponding frame period. Alternatively, according to some example embodiments, for the same scan line, the interval between the time at which a scan signal having a turn-on level and corresponding to the first scan start pulse STP1 is generated and the time at which a scan signal having a turn-on level and corresponding to the second scan start pulse STP2 is generated may be defined as the image display period of the corresponding frame period.

Alternatively, according to some example embodiments, the interval between the time at which the pulse of a horizontal synchronization signal Hsync corresponding to the first scan start pulse STP1 is generated and the time at which the pulse of a horizontal synchronization signal Hsync corresponding to the second scan start pulse STP2 is generated may be defined as the image display period of the corresponding frame period. For example, the image display period ODN may correspond to the difference between the start point of the first period P1 and the start point of the second period P2 in a frame period FPN. The variously defined image display periods have the same duration, and those who skilled in the art may define the image display period in a different manner. As illustrated in FIG. 5, the frame periods FPN, FP(N+1) and FP(N+2) may include the respective image display periods ODN, OD(N+1) and OD(N+2).

The interval between the time at which the second scan start pulse STP2 is generated and the time at which the first scan start pulse STP1 of the next frame period is generated may be defined as the mask period of the corresponding frame period. Alternatively, according to some example embodiments, for the same scan line, the interval between the time at which a scan signal having a turn-on level and corresponding to the second scan start pulse STP2 is generated and the time at which a scan signal having a turn-on level and corresponding to the first scan start pulse STP1 of the next frame period is generated may be defined as the mask period of the corresponding frame period.

Alternatively, according to some example embodiments, the interval between the time at which the pulse of a horizontal synchronization signal Hsync corresponding to the second scan start pulse STP2 is generated and the time at which the pulse of a horizontal synchronization signal Hsync corresponding to the first scan start pulse STP1 of the next frame period is generated may be defined as the mask period of the corresponding frame period. For example, the mask period BDN may correspond to the difference between the start point of the second period P2 and the start point of the first period of the next frame period FP(N+1). The variously defined mask periods have the same duration, and those who skilled in the art may define the mask period in a different manner. As illustrated in FIG. 5, the frame periods FPN, FP(N+1) and FP(N+2) may include the respective mask periods BDN, BD(N+1).

The number of scan lines included in the mask scan group BSG (e.g., four scan lines in the example of FIG. 5) may be a fixed number that is not easily changed due to hardware/time constraints. That is, when the number of scan lines included in the mask scan group BSG is forcibly changed, a problem in which there is not enough time to charge the pixels PXij with data voltages, a problem in which it is difficult for the sensor 15 to have enough sensing time, a problem in which the phase difference of clocks is not secured, and the like may be caused, and which may result in a problem in the display quality of the display device 10.

For example, the number of scan signals having a turn-on level and output from the scan driver 13 during the second period P2 of the first frame period may be the same as the number of scan signals having a turn-on level and output from the scan driver 13 during the second period P2 of the second frame period. The second frame period and the first frame period may be consecutive frames. When the third frame period or the fourth frame period is present in between the second frame period and the first frame period, the number of scan signals having a turn-on level and output from the scan driver 13 during the second period P2 of the third frame period or the fourth frame period may be the same as the number of scan signals having a turn-on level and output from the scan driver 13 during the second period P2 of the first frame period or the second frame period.

Also, the interval between the time at which scan signals having a turn-on level are simultaneously or concurrently supplied to the current mask scan group BSG and the time at which scan signals having a turn-on level are simultaneously or concurrently supplied to the next mask scan group BSG is also not easily changed. For example, when the mask scan group BSG includes four scan lines and when data voltages corresponding to the mask grayscale are written to the pixels PXij during 1 horizontal period 1H, as illustrated in FIG. 5, it is desirable for the mask scan groups BSG to have an interval of 5 horizontal periods. Here, for all of the mask scan groups BSG, the same image display period and the same mask period may be maintained.

Figure 7:
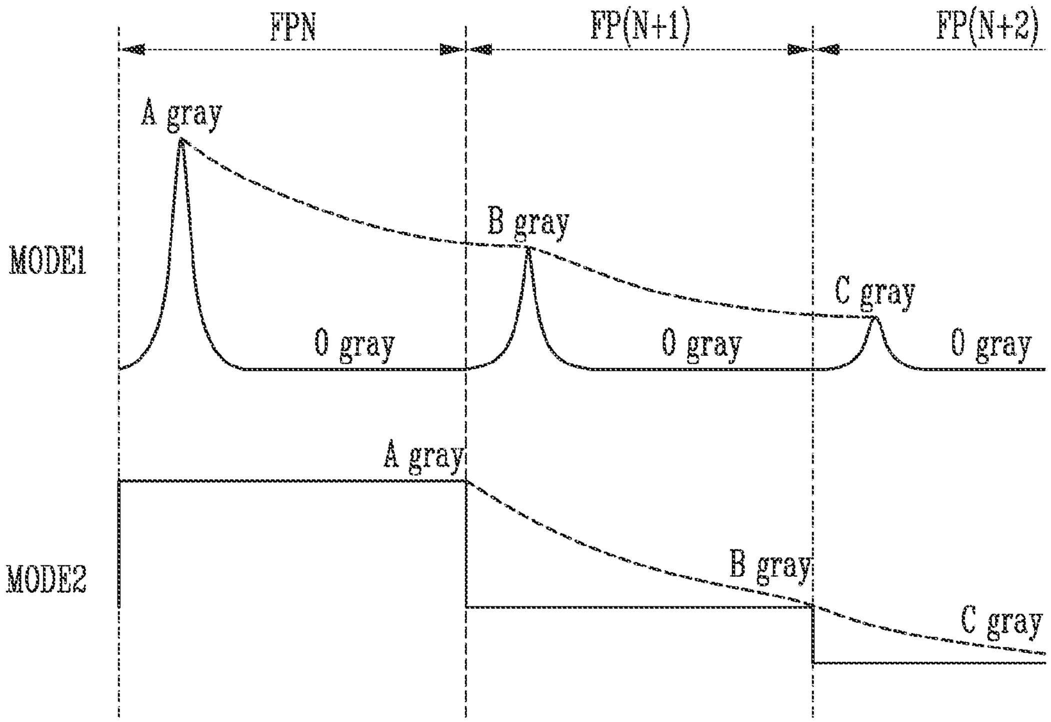
FIG. 7 is a diagram illustrating a difference in luminance perceived by a person depending on a display mode in response to the same image.

FIG. 7 is a diagram illustrating a difference in luminance perceived by a person depending on a display mode in response to the same image.

A first mode MODE1 is a driving mode in which each frame period includes an image display period and a mask period. As described above, the scan driver 13 may supply the first scan start pulse STP1 and the second scan start pulse STP2 in each frame in the first mode MODE1.

A second mode MODE2 is a driving mode in which each frame period includes only an image display period. Here, the scan driver 13 may supply only the first scan start pulse STP1 in each frame.

In the graphs of the first mode MODE1 and the second mode MODE2, the horizontal axis represents time, and the vertical axis represents luminance. For example, it is assumed that an arbitrary pixel PXij emits light with a grayscale of A in the N-th frame period FPN, emits light with a grayscale of B, which is lower than the grayscale of A, in the (N+1)-th frame period FP(N+1), and emits light with a grayscale of C, which is lower than the grayscale of B, in the (N+2)-th frame period FP(N+2). In this case, the speed at which the grayscale perceived by a person changes in the first mode MODE1 may be higher than that in the second mode MODE2, as illustrated in FIG. 7.

That is, when the display device 10 displays a moving or video image in the second mode MODE2, a person may recognize the image later than the time at which the image is actually displayed. This is referred to as a Motion Picture Response Time (MPRT), and in order to improve the MPRT, it is desirable to drive the display device in the first mode MODE1.

Figure 8:
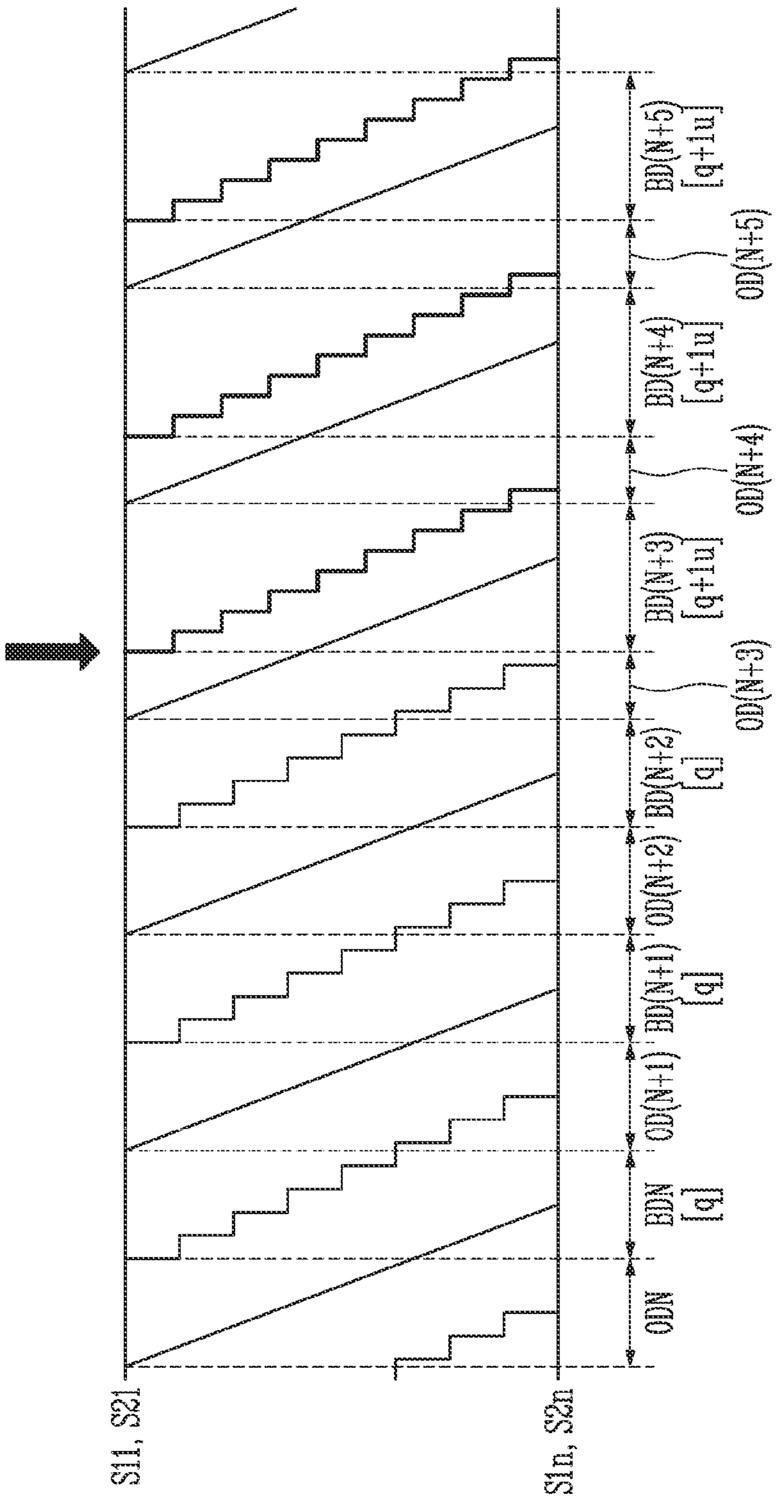
FIG. 8 is a diagram illustrating a change in luminance when a mask period is changed.

FIG. 8 is a diagram illustrating a change in luminance when a mask period is changed.

Referring to FIG. 8, the case in which the N-th to (N+2)-th frame periods include mask periods BDN, BD(N+1) and BD(N+2), each of which has q horizontal periods, and the (N+3)-th to (N+5)-th frame periods include mask periods BD(N+3), BD(N+4) and BD(N+5), each of which has q+1u horizontal periods, is illustrated. That is, from the (N+3)-th frame period, the length of the mask period BD(N+3) increases. For example, this may be the case in which the display device 10 displays a still or static image and then displays a moving or video image. Also, for example, this may be the case in which the display device 10 displays a moving or video image having a small number of changes and then displays a moving or video image having a large number of changes. Here, q and u are integers, each of which is greater than 0.

When it increases or decreases the interval between the time at which the first scan start pulse STP1 is generated and the time at which the second scan start pulse STP2 is generated, the scan start signal generator 17 may increase or decrease the same by an integer multiple of a unit (e.g., a set or predetermined unit) u. When the mask scan groups BSG have an interval of 5 horizontal periods as illustrated in FIG. 5, the unit u may be an integer multiple of 5 horizontal periods. This results from a hardware constraint or a time constraint of the display device 10, as described above.

When the mask period increases by an integer multiple of the unit u as illustrated in FIG. 8, a problem in which a user may perceive an unnecessary change in luminance due to a change in the mask period.

Figure 9:
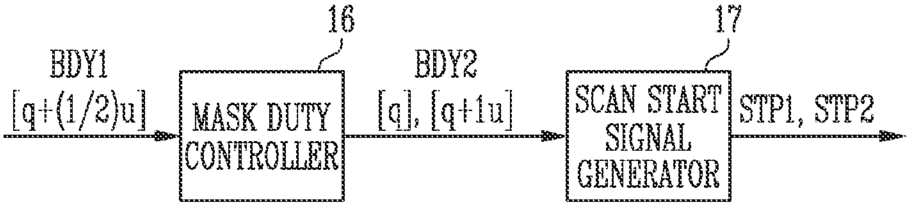
FIG. 9 and FIG. 10 are diagrams illustrating the operations of a mask duty controller and a scan start signal generator according to some example embodiments of the present disclosure.
Figure 10:
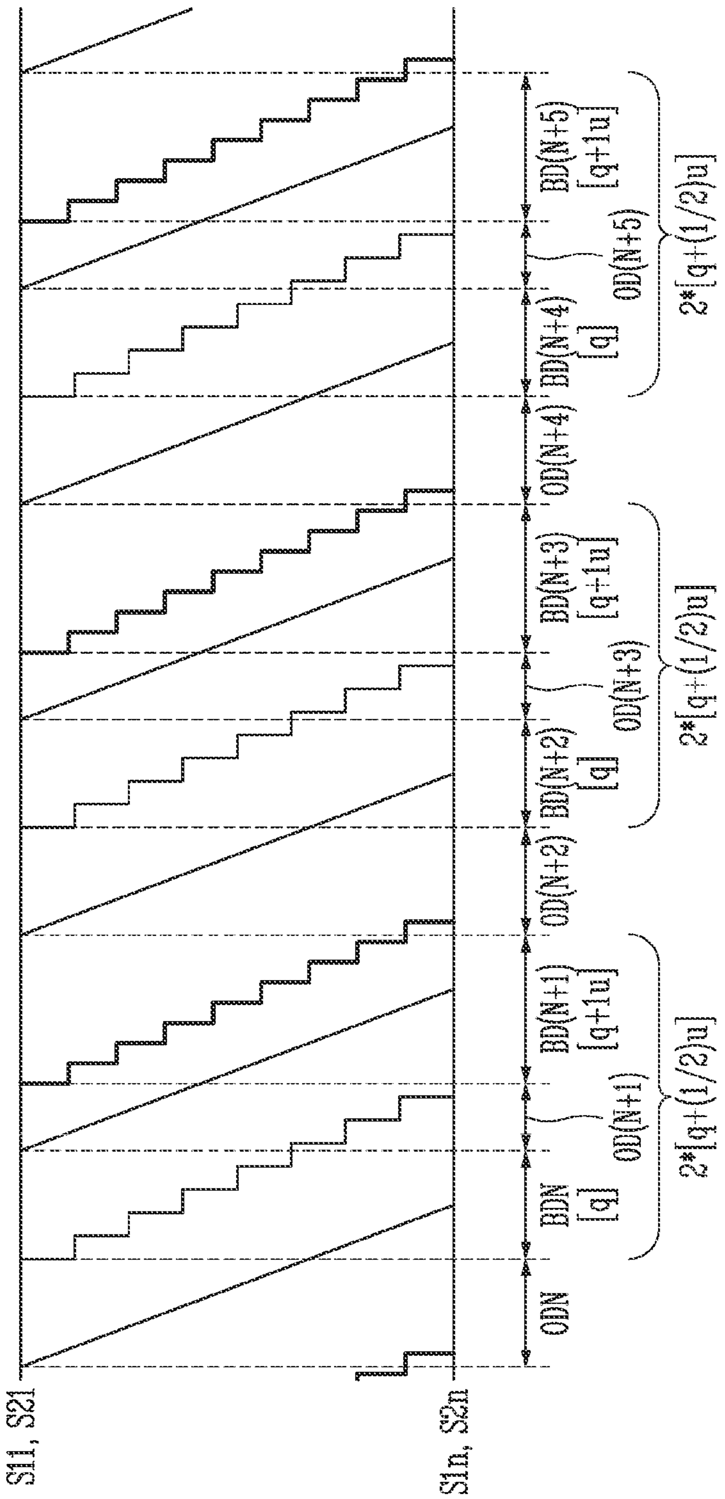

FIG. 9 and FIG. 10 are diagrams illustrating the operations of a mask duty controller and a scan start signal generator according to some example embodiments of the present disclosure.

The mask duty controller 16 may receive first mask duty information BDY1 and supply second mask duty information BDY2 based on the first mask duty information BDY1. The first mask duty information BDY1 may include information about a first mask period, and the second mask duty information BDY2 may include information about a second mask period. The mask duty controller 16 may determine second mask periods for at least two consecutive frame periods based on a single first mask period.

For example, when the first mask period included in the first mask duty information BDY1 is q+(½)u horizontal periods for the N-th and (N+1)-th frame periods FPN and FP(N+1), the mask duty controller 16 may determine the mask period BDN of the N-th frame period FPN to be q horizontal periods and determine the mask period BD(N+1) of the (N+1)-th frame period FP(N+1) to be q+1u horizontal periods. That is, because it is impossible for the scan start signal generator 17 to generate the second scan start pulse STP2 at an interval of q+(½)u horizontal periods, the mask duty controller 16 may supply second mask periods that enable the scan start signal generator 17 to operate.

Also, unlike illustrated in FIG. 9 and FIG. 10, the mask duty controller 16 may determine the mask period BDN of the N-th frame period FPN to be q+1u horizontal periods and determine the mask period BD(N+1) of the (N+1)-th frame period FP(N+1) to be q horizontal periods. That is, the mask duty controller 16 may determine the second mask periods such that the average of the second mask periods is the same as the first mask period.

The scan start signal generator 17 may receive the second mask duty information BDY2 and supply a scan start signal including the first scan start pulse STP1 and the second scan start pulse STP2 based on the second mask duty information BDY2. The second scan start pulse STP2 may be generated in the same frame period as the first scan start pulse STP1 corresponding thereto.

The scan start signal generator 17 may supply the first scan start pulse STP1 and the second scan start pulse STP2 in each frame period, and may determine the interval between the time at which the first scan start pulse STP1 is generated and the time at which the second scan start pulse STP2 is generated based on the second mask period corresponding to each frame period.

For example, the scan start signal generator 17 may generate the second scan start pulse STP2 q horizontal periods before the time at which the first scan start pulse STP1 of the (N+1)-th frame period FP(N+1) is generated. Accordingly, the mask period BDN having a length of q horizontal periods may be realized in the N-th frame period FPN.

Also, the scan start signal generator 17 may generate the second scan start pulse STP2 q+1u horizontal periods before the time at which the first scan start pulse STP1 of the (N+2)-th frame period FP(N+2) is generated. Accordingly, the mask period BD(N+1) having a length of q+1u horizontal periods may be realized in the (N+1)-th frame period FP(N+1).

According to some example embodiments, the user of the display device 10 may perceive the mask period of q+(½)u horizontal periods in each of the N-th and (N+1)-th frame periods FPN and FP(N+1). That is, according to some example embodiments, a virtual mask period of q+(½)u horizontal periods may be implemented using a time-division driving method. That is, the virtual mask period that slightly increases by a fraction multiple of the unit u based on the previous mask period is displayed, whereby instances of the user perceiving an unnecessary or undesired change in luminance may be prevented or reduced.

Figure 11:
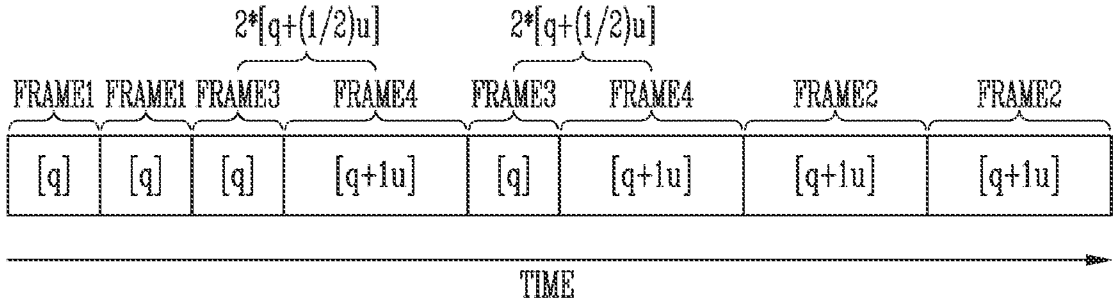
FIG. 11 and FIG. 12 are diagrams illustrating a method of driving a display device according to some example embodiments of the present disclosure.
Figure 12:
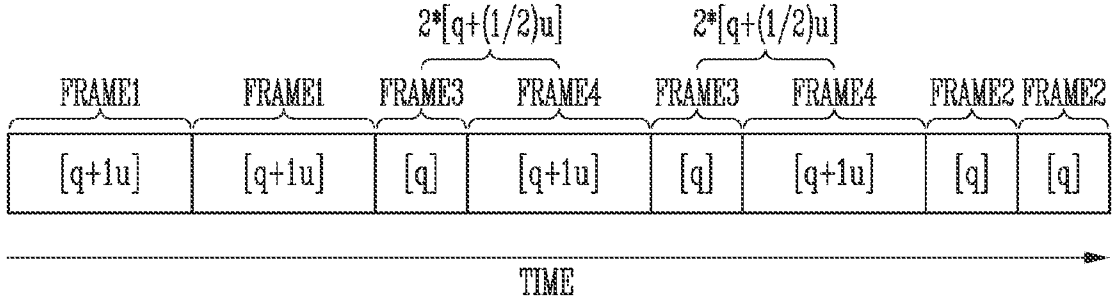

FIG. 11 and FIG. 12 are diagrams illustrating a method of driving a display device according to some example embodiments of the present disclosure.

Referring to FIG. 11, the first frame period FRAME1 having a mask period of q horizontal periods, the third frame period FRAME3 having a mask period of q horizontal periods, the fourth frame period FRAME4 having a mask period of q+1u horizontal periods, and the second frame period FRAME2 having a mask period of q+1u horizontal periods are illustrated.

Here, the first frame period FRAME1 may have an image display period of r horizontal periods. That is, the first frame period FRAME1 may be configured with q+r horizontal periods. Here, q and r may be integers, each of which is greater than 0. Similarly, the third frame period FRAME3 may have an image display period of r horizontal periods. That is, the third frame period FRAME3 may be configured with q+r horizontal periods.

Here, the second frame period FRAME2 may have an image display period of s horizontal periods. That is, the second frame period FRAME2 may be configured with q+1 u+s horizontal periods. Here, u and s may be integers, each of which is greater than 0. Similarly, the fourth frame period FRAME4 may have an image display period of s horizontal periods. That is, the fourth frame period FRAME4 may be configured with q+1u+s horizontal periods. Here, q+r horizontal periods may be the same as q+1u+s horizontal periods. That is, the first to fourth frame periods FRAME1 to FRAME4 may have the same length.

During the image display period of the first to fourth frame periods FRAME1 to FRAME4, pixels may display a moving or video image. During the mask period of the first to fourth frame periods FRAME1 to FRAME4, the pixels may display a monochromatic image (e.g., a black image or a low-grayscale monochromatic image). Here, a description is made based on pixels coupled to the same scan line. The first frame period FRAME1 and the second frame period FRAME2 may have different mask periods. The third frame period FRAME3 between the first frame period FRAME1 and the second frame period FRAME2 may have the same mask period as the first frame period FRAME1. The fourth frame period FRAME4 between the first frame period FRAME1 and the second frame period FRAME2 may have the same mask period as the second frame period FRAME2.

According to some example embodiments, two or more first frame periods FRAME1 may be consecutively arranged, and two or more second frame periods FRAME2 may be consecutively arranged. The third frame period FRAME3 and the fourth frame period FRAME4 may be alternately arranged. The arrangement pattern of the third frame period FRAME3 and the fourth frame period FRAME4 may be repeated x times and then arranged between the first frame periods FRAME1 and the second frame periods FRAME2. Here, x is an integer greater than 0.

That is, at least one third frame period FRAME3 and at least one fourth frame period FRAME4 may be located between the end point of the consecutive first frame periods FRAME1 and the start point of the consecutive second frame periods FRAME2. Here, the at least one third frame period FRAME3 and the at least one fourth frame period FRAME4 may be alternated with each other at regular intervals.

Because a user sequentially perceives a mask period of q horizontal periods, a mask period of q+(½)u horizontal periods, and a mask period of q+1u horizontal periods over time, the user may not perceive an unnecessary change in luminance. The embodiment of FIG. 11 may be used when a displayed image is changed from a still or static image to a moving or video image or when a displayed image is changed from a moving or video image having a small number of changes to a moving or video image having a large number of changes.

Referring to FIG. 12, the first frame period FRAME1 having a mask period of q+1u horizontal periods, the third frame period FRAME3 having a mask period of q horizontal periods, the fourth frame period FRAME4 having a mask period of q+1u horizontal periods, and the second frame period FRAME2 having a mask period of q horizontal periods are illustrated.

That is, the first frame period FRAME1 and the second frame period FRAME2 may have different mask periods. The third frame period FRAME3 between the first frame period FRAME1 and the second frame period FRAME2 may have the same mask period as the second frame period FRAME2. The fourth frame period FRAME4 between the first frame period FRAME1 and the second frame period FRAME2 may have the same mask period as the first frame period FRAME1.

According to some example embodiments, two or more first frame periods FRAME1 may be consecutively arranged, and two or more second frame periods FRAME2 may be consecutively arranged. The third frame period FRAME3 and the fourth frame period FRAME4 may be alternately arranged. The arrangement pattern of the third frame period FRAME3 and the fourth frame period FRAME4 may be repeated x times and then arranged between the first frame periods FRAME1 and the second frame periods FRAME2. Here, x is an integer greater than 0.

Because a user sequentially perceives a mask period of q+1u horizontal periods, a mask period of q+(½)u horizontal periods, and a mask period of q horizontal periods over time, the user may not perceive an unnecessary change in luminance. The embodiment of FIG. 12 may be used when a displayed image is changed from a moving or video image to a still or static image or when the displayed image is changed from a moving or video image having a large number of changes to a moving or video image having a small number of changes.

Figure 13:
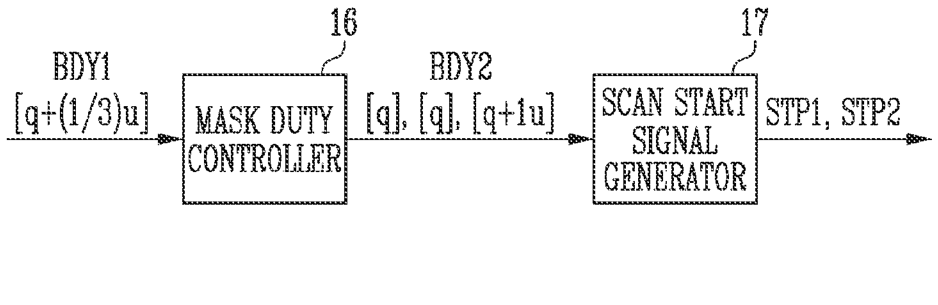
FIG. 13 and FIG. 14 are diagrams illustrating other operations of a mask duty controller and a scan start signal generator according to some example embodiments of the present disclosure.
Figure 14:
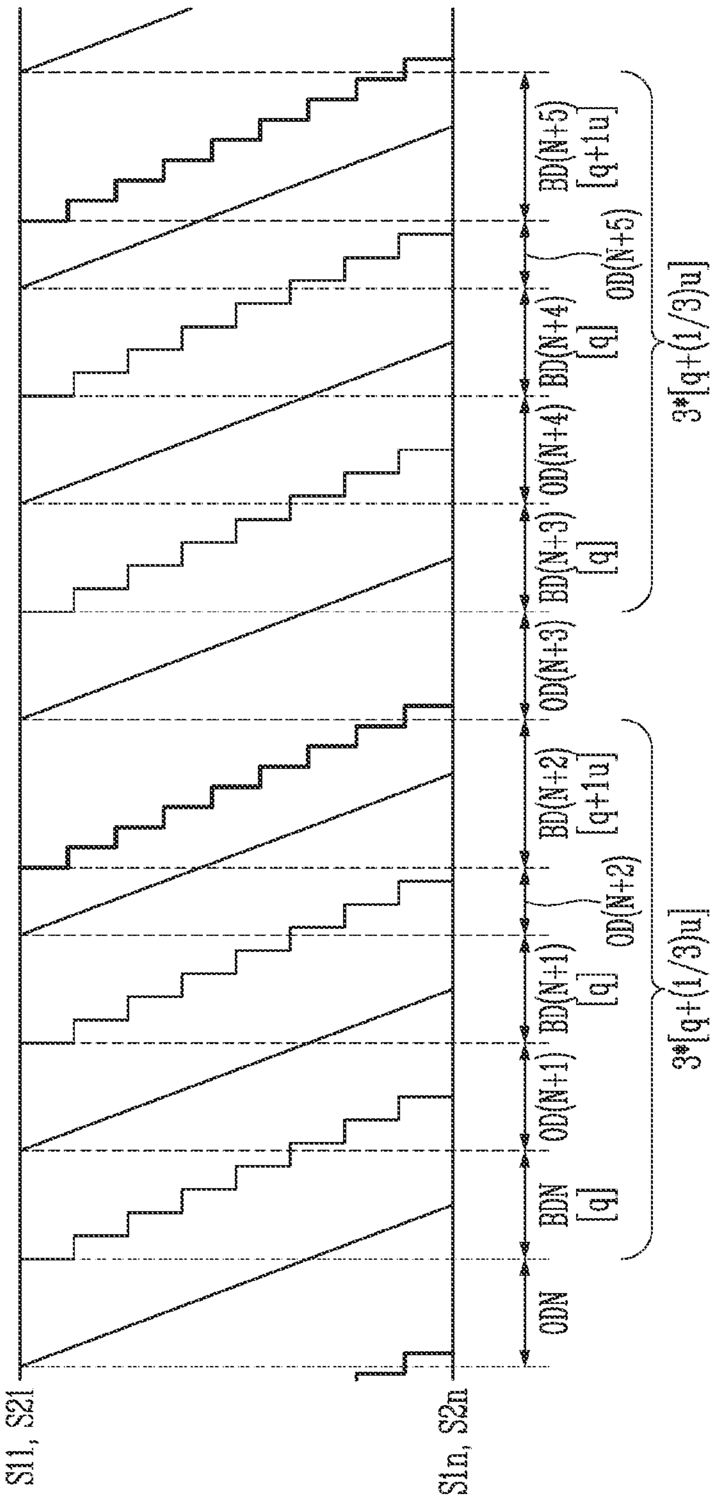

FIG. 13 and FIG. 14 are diagrams illustrating other operations of a mask duty controller and a scan start signal generator according to some example embodiments of the present disclosure.

The mask duty controller 16 may receive first mask duty information BDY1 and supply second mask duty information BDY2 based on the first mask duty information BDY1. The first mask duty information BDY1 may include information about a first mask period, and the second mask duty information BDY2 may include information about a second mask period. The mask duty controller 16 may determine second mask periods for at least two consecutive frame periods based on a single first mask period.

For example, when the first mask period included in the first mask duty information BDY1 is q+(⅓)u horizontal periods for the N-th, (N+1)-th and (N+2)-th frame periods FPN, FP(N+1) and FP(N+2), the mask duty controller 16 may determine the mask period BDN of the N-th frame period FPN to be q horizontal periods, determine the mask period BD(N+1) of the (N+1)-th frame period FP(N+1) to be q horizontal periods, and determine the mask period BD(N+2) of the (N+2)-th frame period FP(N+2) to be q+1u horizontal periods. That is, because it is impossible for the scan start signal generator 17 to generate a second scan start pulse STP2 at an interval of q+(⅓)u horizontal periods, the mask duty controller 16 may provide second mask periods that enable the scan start signal generator 17 to operate.

Also, unlike illustrated in FIG. 13 and FIG. 14, the mask duty controller 16 may determine the mask period BDN of the N-th frame period FPN to be q+1u horizontal periods, determine the mask period BD(N+1) of the (N+1)-th frame period FP(N+1) to be q horizontal periods, and determine the mask period BD(N+2) of the (N+2)-th frame period FP(N+2) to be q horizontal periods. That is, the mask duty controller 16 may determine the second mask periods such that the average of the second mask periods is the same as the first mask period.

The scan start signal generator 17 may receive the second mask duty information BDY2 and supply a scan start signal including the first scan start pulse STP1 and the second scan start pulse STP2 based on the second mask duty information BDY2. The second scan start pulse STP2 may be generated in the same frame period as the first scan start pulse STP1 corresponding thereto.

The scan start signal generator 17 may supply the first scan start pulse STP1 and the second scan start pulse STP2 in each frame period, and may determine the interval between the time at which the first scan start pulse STP1 is generated and the time at which the second scan start pulse STP2 is generated based on the second mask period corresponding to each frame period.

For example, the scan start signal generator 17 may generate the second scan start pulse STP2 q horizontal periods before the time at which the first scan start pulse STP1 of the (N+1)-th frame period FP(N+1) is generated. Accordingly, the mask period BDN having a length of q horizontal periods may be realized in the N-th frame period FPN.

Also, the scan start signal generator 17 may generate the second scan start pulse STP2 q horizontal periods before the time at which the first scan start pulse STP1 of the (N+2)-th frame period FP(N+2) is generated. Accordingly, the mask period BD(N+1) having a length of q horizontal periods may be realized in the (N+1)-th frame period FP(N+1).

Also, the scan start signal generator 17 may generate the second scan start pulse STP2 q+1u horizontal periods before the time at which the first scan start pulse STP1 of the (N+3)-th frame period FP(N+3) is generated. Accordingly, the mask period BD(N+2) having a length of q+1u horizontal periods may be realized in the (N+2)-th frame period FP(N+2).

According to some example embodiments, the user of the display device 10 may perceive the mask period of q+(⅓)u horizontal periods in each of the N-th, (N+1)-th and (N+2) frame periods FPN, FP(N+1) and FP(N+2). That is, according to some example embodiments, a virtual mask period of q+(⅓)u horizontal periods may be implemented in a time-division driving method. That is, the virtual mask period that slightly increases by a fraction multiple of the unit u based on the previous mask period is displayed, whereby the user may not perceive an unnecessary change in luminance.

Figure 15:
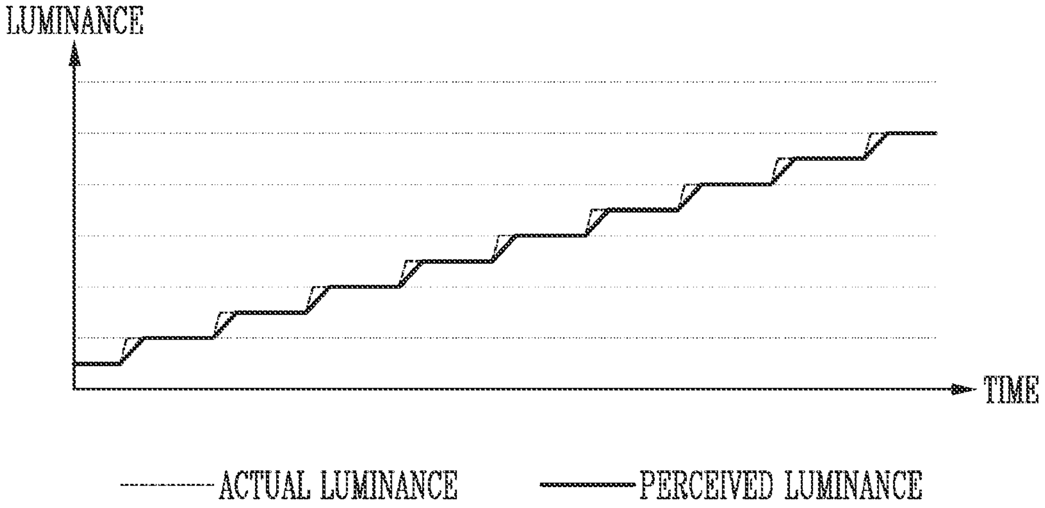
FIG. 15 is a diagram illustrating a change in actual luminance and a change in perceived luminance when a mask period is changed a related system.
Figure 16:
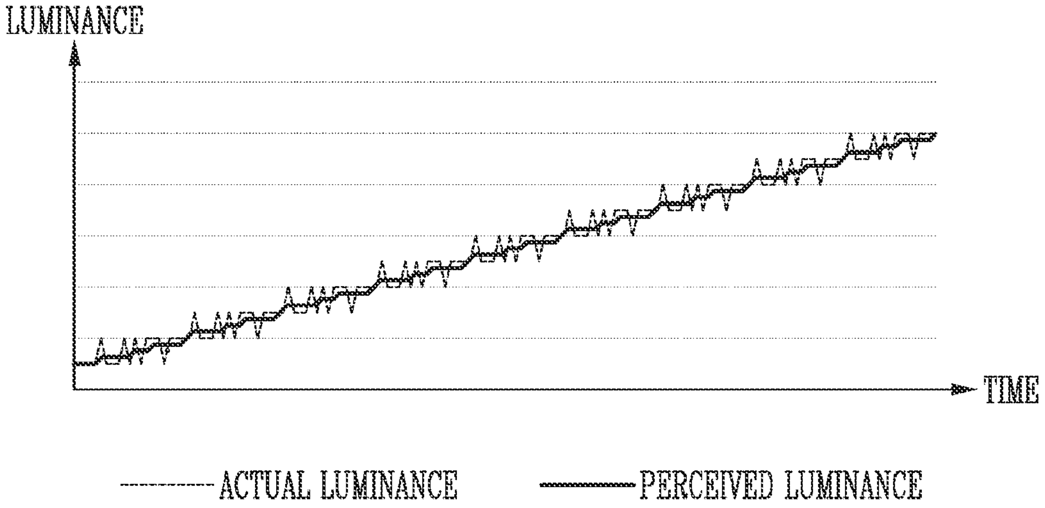
FIG. 16 is a diagram illustrating a change in actual luminance and a change in perceived luminance when a mask period is changed according to some example embodiments of the present disclosure.

FIG. 15 is a diagram illustrating a change in the actual luminance and a change in the perceived luminance when a mask period is changed in the conventional art. FIG. 16 is a diagram illustrating a change in the actual luminance and a change in the perceived luminance when a mask period is changed according to some example embodiments of the present disclosure.

Referring to FIG. 15 and FIG. 16, the case in which a mask period is gradually decreased is illustrated.

In the case illustrated in FIG. 15, a mask period gradually decreases by an integer multiple of a unit u, whereby a user may perceive an unnecessary change in luminance.

In the case illustrated in FIG. 16, a mask period gradually decreases by a fraction multiple of the unit u, whereby instances of a user perceiving an unnecessary or undesired change in luminance may be prevented or reduced.

Figure 17:
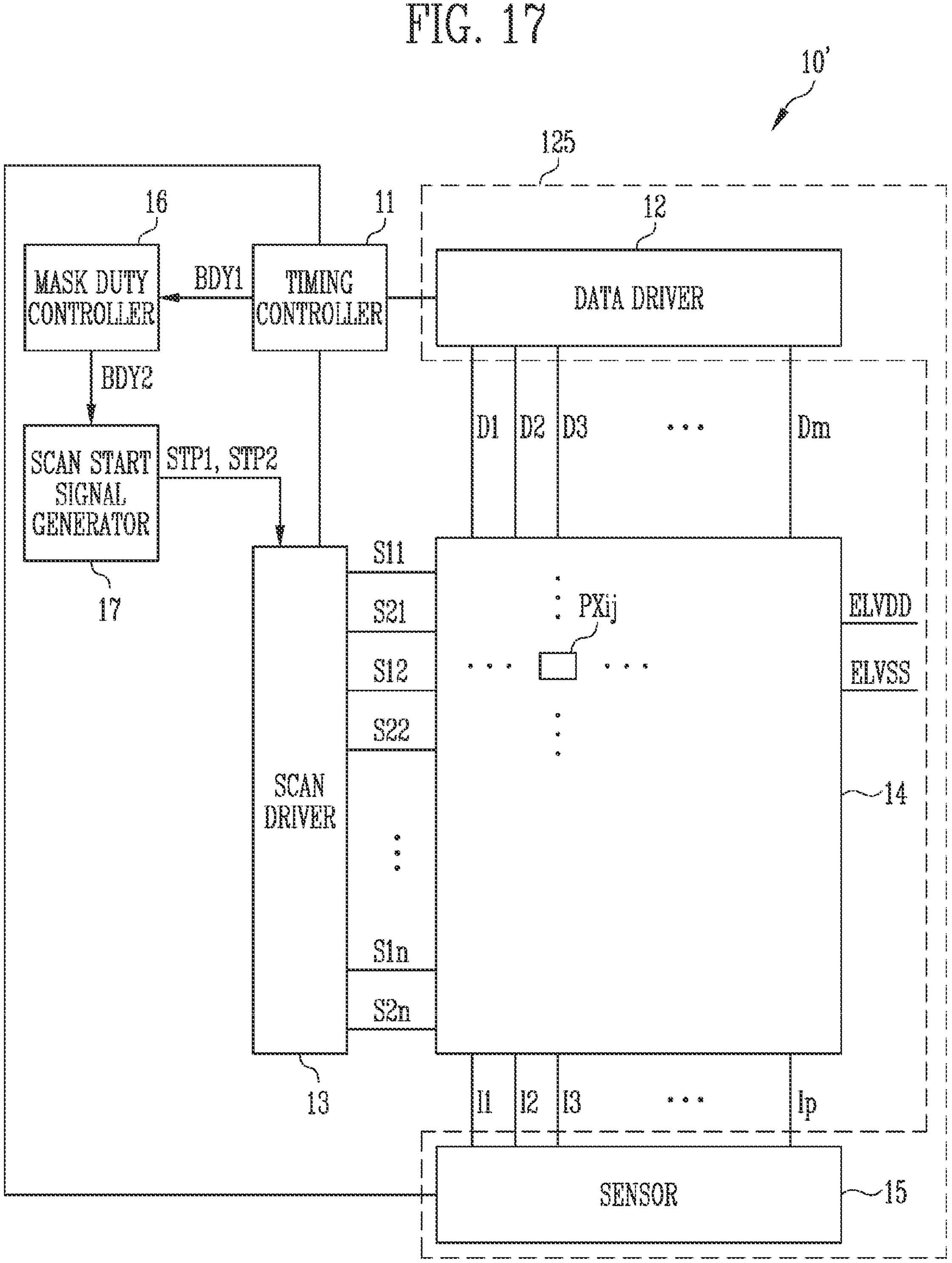
FIG. 17 is a diagram illustrating a display device according to some example embodiments of the present disclosure.

FIG. 17 is a diagram illustrating a display device according to another embodiment of the present disclosure.

Referring to FIG. 17, the data driver 12 and the sensor 15 of the display device 10' may be configured as a single component. For example, the data driver 12 and the sensor 15 may be configured as a single integrated chip (IC) 125.

The other components of the display device 10' of FIG. 17 are the same as those of the display device 10 of FIG. 1, and thus a repeated description will be omitted.

A display device and a driving method thereof according to the present disclosure subdivide the variation of a mask period, thereby instances of users perceiving changes in luminance may be prevented or reduced, even when the mask period is changed.

The drawings and the detailed description of the present disclosure are examples for the present disclosure and are provided for illustrative purpose, rather than limiting the scope of the present disclosure described in the claims. Therefore, it will be appreciated to those skilled in the art that various modifications may be made and other embodiments are available. Accordingly, the scope of the present disclosure should be determined by the spirit and scope of the appended claims and their equivalents.

What is claimed is:

1. A display device, comprising:

pixels; and a data driver configured to supply data voltages corresponding to grayscale values of a frame to the pixels during a first period and to supply a data voltage corresponding to a mask grayscale to the pixels during a second period after the first period, wherein:

a mask period corresponds to a difference between a start point of the second period and a start point of the first period in a next frame period, a first frame period and a second frame period have different mask periods, a third frame period between the first frame period and the second frame period has a same mask period as the first frame period, and a fourth frame period between the third frame period and the second frame period has a same mask period as the second frame period.

2. The display device according to claim 1, further comprising:

a scan driver configured to sequentially supply scan signals having a turn-on level to a first scan line and a second scan line during the first period and to concurrently supply scan signals having a turn-on level to the first scan line and the second scan line during the second period.

3. The display device according to claim 2, wherein:

each frame period includes an image display period and the mask period, and the image display period corresponds to a difference between a start point of the first period and a start point of the second period in one frame period.

4. The display device according to claim 2, further comprising:

a scan start signal generator configured to supply a first scan start pulse, corresponding to a start point of the first period, and a second scan start pulse, corresponding to a start point of the second period, to the scan driver.

5. The display device according to claim 4, wherein:

an interval between a time at which the first scan start pulse is generated and a time at which the second scan start pulse is generated in the first frame period is different from that in the second frame period, an interval between a time at which the first scan start pulse is generated and a time at which the second scan start pulse is generated in the third frame period is equal to that in the first frame period, and an interval between a time at which the first scan start pulse is generated and a time at which the second scan start pulse is generated in the fourth frame period is equal to that in the second frame period.

6. The display device according to claim 2, wherein the pixels comprise:

a first pixel coupled to the first scan line and a data line; and a second pixel coupled to the second scan line and the data line.

7. The display device according to claim 6, wherein the pixels further comprise:

a third pixel coupled to a third scan line and the data line; and a fourth pixel coupled to a fourth scan line and the data line, wherein:

the scan driver is configured to supply a scan signal having a turn-on level to the third scan line during a third period and to supply a scan signal having a turn-on level to the fourth scan line during a fourth period, and the first period, the third period, the second period, and the fourth period are sequentially located in a frame period.

8. The display device according to claim 7, wherein the first period is longer than each of the second period, the third period, and the fourth period.

9. The display device according to claim 8, wherein the second period, the third period, and the fourth period have a same length.

10. The display device according to claim 2, wherein a number of scan signals having the turn-on level and output from the scan driver during the second period in the first frame period is equal to a number of scan signals having the turn-on level and output from the scan driver during the second period in the second frame period.

11. A method of driving a display device including a data driver and pixels, the method comprising:

supplying, by the data driver, data voltages corresponding to grayscale values of a frame to the pixels during a first period of each frame period, and supplying, by the data driver, a data voltage corresponding to a mask grayscale to the pixels during a second period of each frame period, wherein:

a mask period corresponds to a difference between a start point of the second period and a start point of the first period in a next frame period, a first frame period and a second frame period have different mask periods, a third frame period between the first frame period and the second frame period has a same mask period as the first frame period, and a fourth frame period between the third frame period and the second frame period has a same mask period as the second frame period.

12. The method according to claim 11, further comprising:

sequentially supplying, by a scan driver, scan signals having a turn-on level to a first scan line and a second scan line during the first period, and concurrently supplying, by the scan driver, scan signals having a turn-on level to the first scan line and the second scan line during the second period.

13. The method according to claim 12, further comprising:

supplying a first scan start pulse, corresponding to a start point of the first period, and a second scan start pulse, corresponding to a start point of the second period, to the scan driver.

14. The method according to claim 13, wherein:

an interval between a time at which the first scan start pulse is generated and a time at which the second scan start pulse is generated in the first frame period is different from that in the second frame period, an interval between a time at which the first scan start pulse is generated and a time at which the second scan start pulse is generated in the third frame period is equal to that in the first frame period, and an interval between a time at which the first scan start pulse is generated and a time at which the second scan start pulse is generated in the fourth frame period is equal to that in the second frame period.

15. The method according to claim 12, wherein the pixels comprise:

a first pixel coupled to the first scan line and a data line; and a second pixel coupled to the second scan line and the data line.

16. The method according to claim 15, wherein:

the pixels further comprise a third pixel coupled to a third scan line and the data line; and a fourth pixel coupled to a fourth scan line and the data line, and the method further comprises supplying, by the scan driver, a scan signal having a turn-on level to the third scan line during a third period and supplies a scan signal having a turn-on level to the fourth scan line during a fourth period, wherein the first period, the third period, the second period, and the fourth period are sequentially located in a frame period.

17. The method according to claim 16, wherein the first period is longer than each of the second period, the third period, and the fourth period.

18. The method according to claim 17, wherein the second period, the third period, and the fourth period have a same length.

19. The method according to claim 12, wherein a number of scan signals having the turn-on level and output from the scan driver during the second period in the first frame period is equal to a number of scan signals having the turn-on level and output from the scan driver during the second period in the second frame period.

* * * * *